(12) United States Patent
Huang

(10) Patent No.: US 9,201,269 B2
(45) Date of Patent: Dec. 1, 2015

(54) BACKLIGHT FOR LIQUID CRYSTAL DISPLAY DEVICE HAVING A REFLECTOR BEING COATED WITH A GRADATION COLOR LAYER COMPOSED BY YELLOW GRADUATING TO BLUE

(75) Inventor: Jianfa Huang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 412 days.

(21) Appl. No.: 13/512,347

(22) PCT Filed: May 4, 2012

(86) PCT No.: PCT/CN2012/075062
§ 371 (c)(1),
(2), (4) Date: May 28, 2012

(87) PCT Pub. No.: WO2013/159376
PCT Pub. Date: Oct. 31, 2013

(65) Prior Publication Data
US 2013/0286324 A1 Oct. 31, 2013

(30) Foreign Application Priority Data

Apr. 27, 2012 (CN) .......................... 2012 1 0128693

(51) Int. Cl.
*G02F 1/1335* (2006.01)
*F21V 8/00* (2006.01)

(52) U.S. Cl.
CPC ........ *G02F 1/133615* (2013.01); *G02B 6/0035* (2013.01); *G02B 6/0043* (2013.01); *G02B 6/0055* (2013.01); *G02B 6/0061* (2013.01); *G02F 1/133605* (2013.01); *G02F 2001/133614* (2013.01)

(58) Field of Classification Search
USPC ........................................... 349/64
See application file for complete search history.

(56) References Cited

U.S. PATENT DOCUMENTS 6,345,899 B1 * 2/2002 Ohkawa et al. ............... 362/611
2006/0291236 A1 * 12/2006 Hsu et al. ..................... 362/561

* cited by examiner

*Primary Examiner* — Lauren Nguyen
(74) *Attorney, Agent, or Firm* — Andrew C. Cheng

(57) ABSTRACT

The present invention discloses a backlight module configured with a light source, a waveguide, a reflector and an optical film. The waveguide includes a light inlet surface facing the light source, and a light emitting surface which is adjacent to the light inlet surface, and a bottom surface opposite to the light emitting surface. The reflector is disposed under the bottom surface of the waveguide. An optical film is disposed above the light emitting surface of the waveguide. Wherein the reflector is coated with a gradation color layer composed by yellow graduating to blue so as to ensure the projected light from the light source is homogeneous with reduced chromatic aberration.

7 Claims, 5 Drawing Sheets

BACKLIGHT FOR LIQUID CRYSTAL DISPLAY DEVICE HAVING A REFLECTOR BEING COATED WITH A GRADATION COLOR LAYER COMPOSED BY YELLOW GRADUATING TO BLUE

FIELD OF THE INVENTION

The present invention relates to a technical field of liquid crystal display, and more particularly to a backlight module and liquid crystal display module.

BACKGROUND OF THE INVENTION

Liquid crystal filled in a liquid crystal display (LCD) panel does not emit light, and it needs a backlight module to light up so as to clearly display the patterns to be displayed on the LCD panel. The arrangement of a source arranged on the backlight module can be referred to as a vertical-type, and a side-type.

In the side-type backlight module. a chromatic aberration could be encountered since the printing pattern on the waveguide will absorb the light source. In addition, different bins of the LED will also attribute the chromatic aberration. This chromatic aberration will become worse as the dimension of the LCD panel becomes larger.

It is therefore an objective of this invention to provide a technical solution to address the prior art problems.

SUMMARY OF THE INVENTION

It is an objective of this invention to provide a backlight module and a LCD device in which chromatic aberration can be reduced to its lowest level so as to achieve homogeneousness on the light beam projected from the backlight module.

In order to resolve the prior art technical issues, the present invention provides a backlight module which comprises a light source and a waveguide including an light inlet surface facing the light source, and an light emitting surface being adjacent to the light inlet surface, and a bottom surface opposite to the light emitting surface. A reflector is disposed under the bottom surface of the waveguide. An optical film is disposed above the light emitting surface of the waveguide. Wherein the reflector is coated with a gradation color layer composed by yellow graduating to blue, wherein the percentage of the blue pigment proportionally increases as it is distant to the light source. The bottom surface of the waveguide includes a printing pattern is mixed by ink and pigments. And the percentage of the pigments within the printing pattern changes proportionally with respect to the distance with respect to the light source.

Wherein when the pigment is the blue pigments, the percentage of the blue pigment within the printing pattern increases proportionally when the distance to the light source increases. When the pigment is the yellow pigments, the percentage of the blue pigment within the printing pattern decreases proportionally when the distance to the light source decreases.

In order to resolve the prior art technical issues, the present invention provides a backlight module which comprises a light source and a waveguide including an light inlet surface facing the light source, and an light emitting surface being adjacent to the light inlet surface, and a bottom surface opposite to the light emitting surface. A reflector is disposed under the bottom surface of the waveguide. An optical film is disposed above the light emitting surface of the waveguide. Wherein the reflector is coated with a gradation color layer composed by yellow graduating to blue.

Wherein the percentage of the blue pigment proportionally increases as it is distant to the light source.

Wherein the bottom surface of the waveguide includes ink printing patterns and color compensation patterns, wherein when the pigment is the blue fluorescent pigments, the he percentage of the blue pigment within the printing pattern increases proportionally when the distance to the light source increases; when the pigment is the yellow fluorescent pigments. the percentage of the blue pigment within the printing pattern decreases proportionally when the distance to the light source decreases.

Wherein dots of the printing pattern remain unchanged.

Wherein the printing patterns and the color compensation patterns are configured into a single layer configuration, and the printing patterns and the color compensation patterns are alternatively arranged across the bottom surface of the waveguide.

Wherein the printing patterns and the color compensation patterns are stacked into two layers, and the color compensation patterns is arranged on a first layer of the bottom surface of the waveguide, and the ink printing patterns is located on a second layer of the bottom surface of the waveguide.

Wherein the printing patterns and the color compensation patterns are stacked into two layers, the ink printing patterns is located on a first layer of the bottom surface of the waveguide. and the color compensation patterns is arranged on a second layer of the bottom surface of the waveguide.

Wherein the bottom surface of the waveguide includes patterns composed by ink and color pigments, and a percentage of the pigments within the printing pattern changes proportionally with respect to the distance with respect to the light source.

Wherein when the pigment is the blue pigments, the he percentage of the blue pigment within the printing pattern increases proportionally when the distance to the light source increases; when the pigment is the yellow pigments. the percentage of the blue pigment within the printing pattern decreases proportionally when the distance to the light source decreases.

In order to resolve the prior art technical issues, the present invention provides a liquid crystal display device which includes a liquid crystal display panel. The device further includes a backlight module which includes a light source and a waveguide including a light inlet surface facing the light source, and a light emitting surface being adjacent to the light inlet surface, and a bottom surface opposite to the light emitting surface. A reflector is disposed under the bottom surface of the waveguide. An optical film is disposed above the light emitting surface of the waveguide. Wherein the reflector is coated with a gradation color layer composed by yellow graduating to blue.

Wherein the gradation color layer includes a blue pigment, and the percentage of the blue pigment proportionally increases as it is distant to the light source.

Wherein the bottom surface of the waveguide includes ink printing patterns and color compensation patterns, wherein when the pigment is the blue fluorescent pigments, the he percentage of the blue pigment within the printing pattern increases proportionally when the distance to the light source increases; when the pigment is the yellow fluorescent pigments. the percentage of the blue pigment within the printing pattern decreases proportionally when the distance to the light source decreases.

Wherein dots of the printing pattern remain unchanged.

Wherein the printing patterns and the color compensation patterns are configured into a single layer configuration, and the printing patterns and the color compensation patterns are alternatively arranged across the bottom surface of the waveguide.

Wherein the printing patterns and the color compensation patterns are stacked into two layers, and the color compensation patterns is arranged on a first layer of the bottom surface of the waveguide, and the ink printing patterns is located on a second layer of the bottom surface of the waveguide.

Wherein the printing patterns and the color compensation patterns are stacked into two layers, the ink printing patterns is located on a first layer of the bottom surface of the waveguide, and the color compensation patterns is arranged on a second layer of the bottom surface of the waveguide.

Wherein the bottom surface of the waveguide includes patterns composed by ink and color pigments, and a percentage of the pigments within the printing pattern changes proportionally with respect to the distance with respect to the light source.

Wherein when the pigment is the blue pigments, the he percentage of the blue pigment within the printing pattern increases proportionally when the distance to the light source increases: when the pigment is the yellow pigments, the percentage of the blue pigment within the printing pattern decreases proportionally when the distance to the light source decreases.

The present invention can be concluded with the following advantages. As compared with the existing prior arts, the reflector is coated with a pigment layer graduating from yellow to blue so as to provide a color correction with the waveguide in a way that the projected light beam therefrom has a uniform color thereby reducing the chromatic aberration.

DETAILED DESCRIPTION OF PREFERRED EMBODIMENTS

Figure 1:
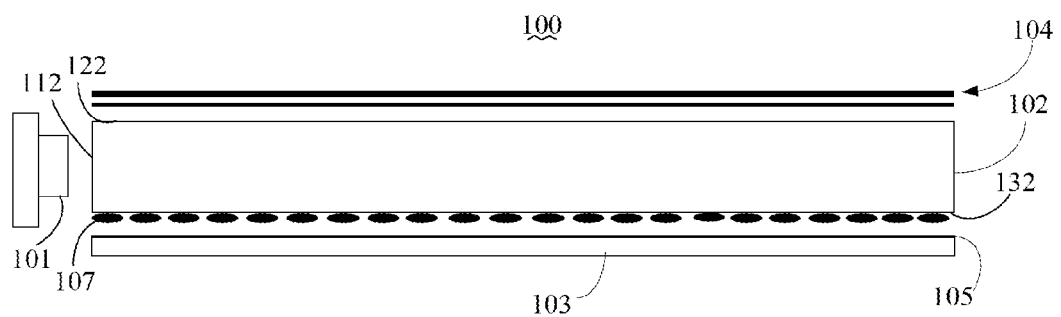
FIG. 1 is a cross sectional view of a liquid crystal display device made in accordance with a first embodiment of the present invention.

Referring to FIG. 1, a cross sectional view of a liquid crystal display device made in accordance with a first embodiment of the present invention is shown. The backlight module 10 includes a light source 101, a waveguide 102, a reflector 103 and an optical film 104. The waveguide 102 includes a light inlet surface 112, a light emitting surface 122 which is adjacent to the light inlet surface 112 and almost perpendicular to each other, and a bottom surface 132 which is opposite to the light emitting surface 122. The light inlet surface 112 is facing toward the light source 101. The bottom surface 132 includes a layer of ink printing patterns 107.

The optical film is disposed above the light emitting surface 122 of the waveguide 102. and which can be embodied as a diffuser and a light enhancer.

The reflector 103 is disposed under the bottom surface 132 of the waveguide 102, and the reflector is coated with a layer of pigments of color gradation 105 which graduates from yellow to blue. The function of this color gradation layer is to provide an elective absorption to the light reflected from the reflector 103 so as to provide a homogeneous color distribution.

In the preferred embodiment of the present invention, the percentage of the blue pigment within the color gradation 105 increases proportionally as a distance with respect to the light source 1 increases.

Figure 2:
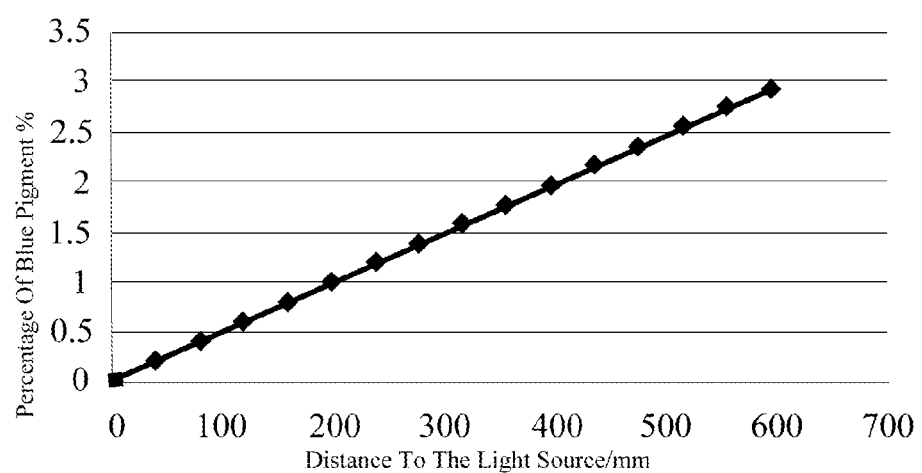
FIG. 2 is a diagram illustrating a variation of the percentage of a blue pigment which varies proportionally to a distance with respect to a light source.

FIG. 2 is a diagram illustrating a variation of the percentage of a blue pigment which varies proportionally to a distance with respect to a light source. As shown in FIG. 2, the horizontal axis illustrates a distance with respect to the light source 101, i.e. it shows a distance between the blue pigment and the light source 101. Its unit is minimeter. The vertical axis represents the percentage of the blue pigment within the color gradation 105.

In this preferred embodiment, since the bottom surface 132 of the waveguide 102 is coated with ink printing patterns 107 and which may absorb and diffuse the incoming light. In addition, the ink printing patterns 107 has a stronger absorption to the light of short wavelength than those of longer wavelength, such as the green light and blue light instead of red light.

Accordingly, since it is closer to the light source 101, and a distance from the light source 101 through the waveguide 102 is shorter. As a result, the loss of the green light and blue light of the shorter wavelength is comparably smaller. Accordingly, in this area, the percentage of the blue pigment can be reduced, and this is the reason when the percentage of the blue pigment is smaller as it is closer to the light source 101.

When the distance between the blue pigment and the light source 101 is zero (0), the percentage of the blue pigment is zero.

As the light travels within the waveguide 102, the absorption of light with shorter wavelength becomes more and more evident and the color gradates from blue to yellow. Accordingly, the percentage of blue pigments has to increase so as to compensate the yellowish light. In light of this, the percentage of the blue pigments within the color gradation 105 increases as it becomes distant to the light source 101 so as to absorb those additional yellowish light reflected to the reflector 103. As a result, a homogeneous light beam with uniform colors will be emitted from the backlight module 100.

Figure 3:
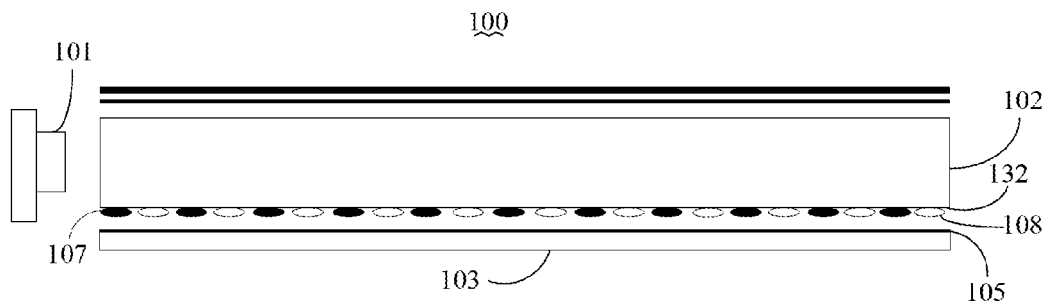
FIG. 3 is a cross sectional view of a liquid crystal display device made in accordance with a second embodiment of the present invention.

FIG. 3 is a cross sectional view of a liquid crystal display device made in accordance with a second embodiment of the present invention. The second embodiment is provides an improvement based on the first embodiment shown in FIG. 1. Substantially, as shown in FIG. 3, the bottom surface 102 of the backlight module 100 further includes a color compensation patterns 108 alternatively arranged with the ink printing pattern 107.

Figure 5:
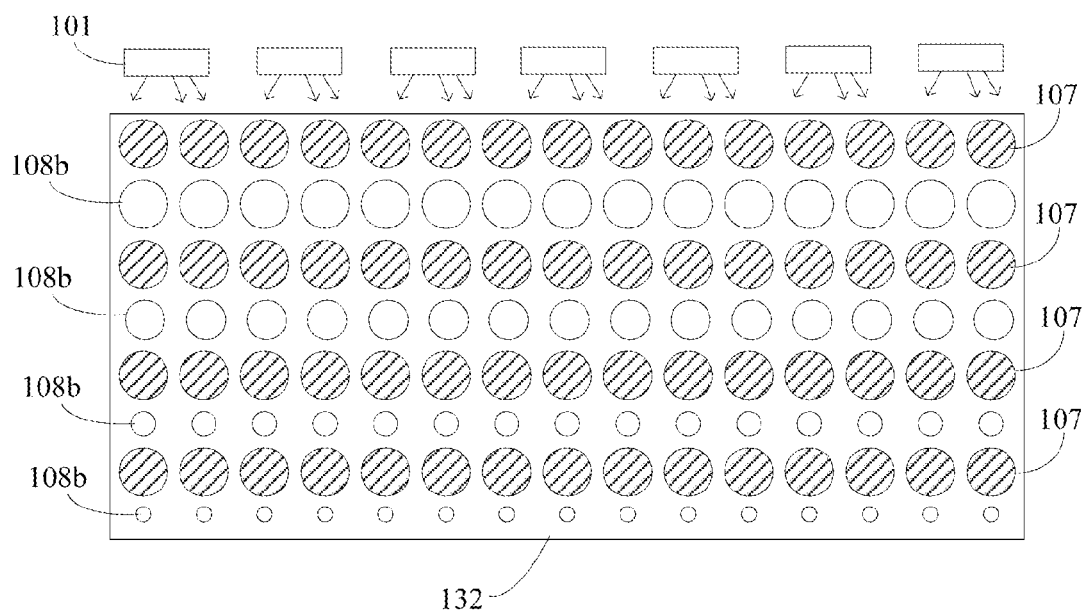
FIG. 5 is an illustration second embodiment of an arrangement of an ink printing pattern and a color compensation pattern shown in FIG. 3.
Figure 6:
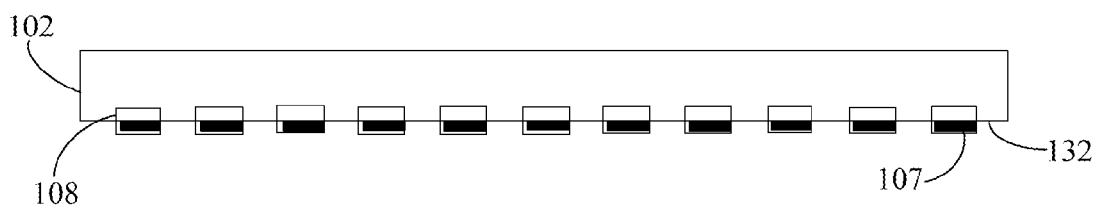
FIG. 6 is an illustration third embodiment of an arrangement of an ink printing pattern and a color compensation pattern shown in FIG. 3.

The color compensation patterns 108 are composed with fluorescent powders so as to generate a certain or preselected color based on the pigment used. The arrangement between the ink printing patterns 107 and the color compensation patterns 108 are shown in FIGS. 4 to 6.

Figure 4:
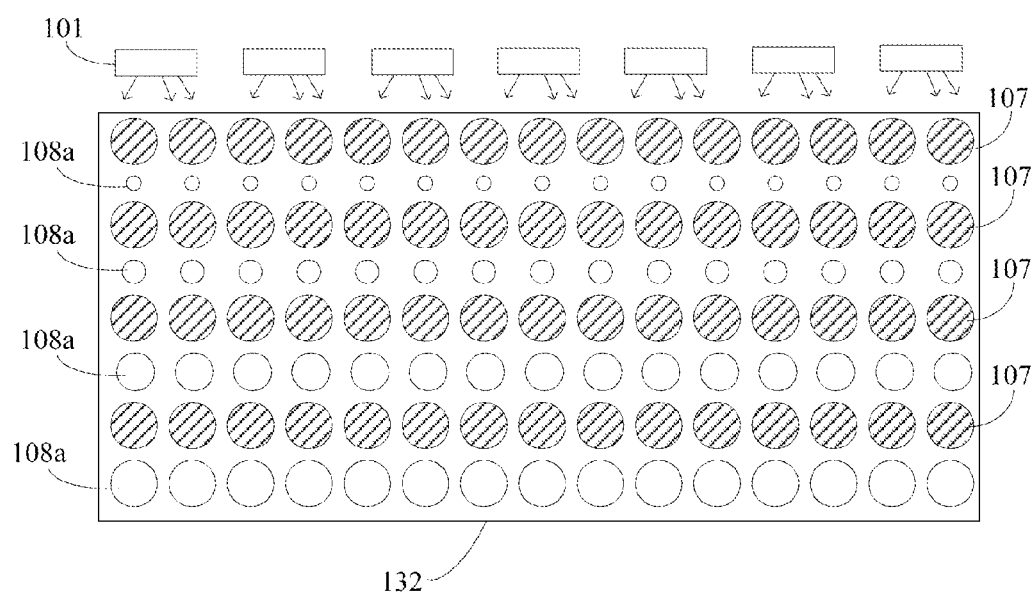
FIG. 4 is an illustration first embodiment of an arrangement of an ink printing pattern and a color compensation pattern shown in FIG. 3.

FIG. 4 is an illustration first embodiment of an arrangement of an ink printing pattern and a color compensation pattern illustrate in FIG. 3. As shown in FIG. 4, the color compensation patterns 108 is a blue fluorescent pigment, and it composed a single layer along with the ink printing pattern 107. The ink printing pattern 107 and the blue fluorescent patterns 108a are alternatively distributed across the bottom surface 132 of the waveguide 102. In other words, the ink printing pattern 107 configures a row, while the blue fluorescent pigment 108a configures another row, and they are alternatively distributed across the bottom surface 132 of the waveguide 102. The substantial arrangement will be further described as below.

The ink printing pattern 107 is arranged to a side on the waveguide 102 closet to the waveguide 102. As a result, a first row of ink printing pattern 107 is formed. Then. a row, which is located a preselected distance to the first row, of blue fluorescent patterns 108a is formed. In this embodiment, the size or dimension of the ink printing patterns 107 remains unchanged across the waveguide 102, while the size or dimension of the blue fluorescent pigment 108a increases as it becomes distant and distant from the light source 101.

The working principle of the arrangement of the ink printing patterns 107 and the blue fluorescent pigments 108a will be better described as below.

During the travel of the projected light beam from the light source 101 with the waveguide 102, the percentage of the light with shorter wavelength becomes fewer and fewer, accordingly, the color of the light will gradate from bluish to yellowish. Accordingly. in order to stabilize the bluish color of the light through out of its travel within the waveguide 102, the proportion between the bluish light and the yellowish light has to be remained to a constant so as to ensure the light coming out of the waveguide 102 remains unchanged. In the present embodiment, since it is closer to the light source 100. the path that the inlet light travels within the waveguide 102 is not longer, and the absorption to the light with shorter wavelength is not apparent, as a result, only some blue fluorescent pigment with small size or dimension will be good enough to serve the purpose. However, while the path of light travelling within the waveguide 102 becomes longer and longer, the absorption of the light with shorter wavelength becomes more and more apparent, and the color of the light becomes yellowish, and it needs more blue fluorescent pigments to compensate. As a result, the size or dimension of the blue fluorescent pigments 108a becomes larger and larger.

In this embodiment, the size or dimension of the ink printing pattern 107 can be remained unchanged, while it can also make some alternation according to the actual requirements. As result, no further description is given.

FIG. 5 is an illustration second embodiment of an arrangement of an ink printing pattern and a color compensation pattern shown in FIG. 3. The difference between FIGS. 4 and 5 is that in FIG. 5, the color compensation patterns 108b is a yellow fluorescent pigments, and it has the largest size or dimension closet to the slight source 101. However, as it becomes distant and distant to the light source 101. the size or dimension of the yellow fluorescent pigments 108b become smaller and smaller.

In this embodiment, when the light projected from the light source 101 hits the yellow fluorescent pigments 108b, the color of the light will turn yellowish. Since it closes to the light source 101, and the path it travels within the waveguide 102 is not that long, the absorption of the light with shorter wavelength is not apparent, as a result, the light is still bluish. Accordingly, the size or dimension of the yellow fluorescent pigment 108b is comparably larger so as to compensate the color. With the light travels through the waveguide 102, the absorption of the light by the ink printing pattern 107 becomes more and more, and the light within the waveguide 102 becomes yellowish. With the necessity of the color compensation reduces gradually, the size or dimension of the yellow fluorescent pattern 108b becomes smaller and smaller.

In this embodiment, the size or dimension of the ink printing pattern 107 can be remained unchanged, while it can also make some alternation according to the actual requirements. As result, no further description is given.

Referring to FIG. 6 of which disclosed is an illustration third embodiment of an arrangement of an ink printing pattern and a color compensation pattern shown in FIG. 3. In FIG. 3, the ink printing pattern 107 and the color compensation pattern 108 are stacked into two layers over the bottom surface 132 of the waveguide 102. The color compensation pattern 108 is deployed firstly over an internal side of the bottom surface 132 of the waveguide 102, and then ink printing pattern 108 is deployed over an external side of the bottom surface 132 of the waveguide. Both are separated from each other without any interference. This is preferable for making waveguide 102 and is beneficial to the yield.

Alternatively, the location of the ink printing pattern 107 and the color compensation pattern 108 can be exchanged from each other, i.e. the internal side of the bottom surface can be deployed with ink printing pattern 107, while the external side of the bottom surface 132 can be deployed with color compensation pattern 108.

It can be readily understood that the color compensation patterns 108 can be embodied as the blue fluorescent pattern 108a, or the yellow fluorescent pattern 108b. In addition, the size or dimension of those patterns 108a and 108b across internal and external sides of the bottom surface 132 of the waveguide 102 can be determined according to the above description in view of FIGS. 4 and 5. As a result, no detailed description is given.

Figure 7:
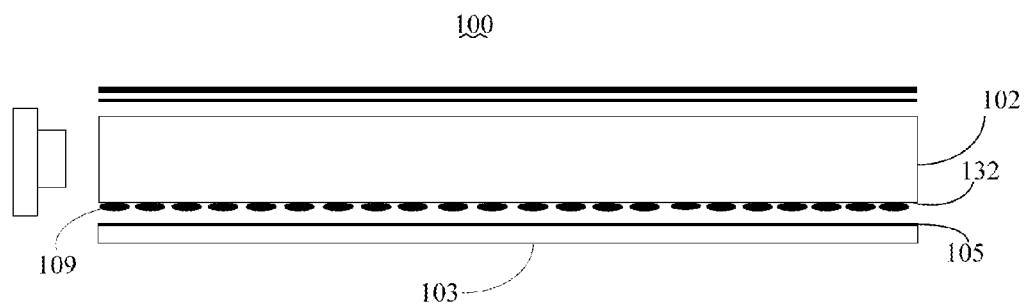
FIG. 7 is a cross sectional view of a liquid crystal display device made in accordance with a third embodiment of the present invention.

FIG. 7 is a cross sectional view of a liquid crystal display device made in accordance with a third embodiment of the present invention. This is an improvement over the first embodiment of the backlight module 100 discussed above.

Substantially, as shown in FIG. 7, the bottom surface 132 of the waveguide 102 of the backlight module 100 further includes a pattern composed by the ink pattern and the color pigments.

Figure 8:
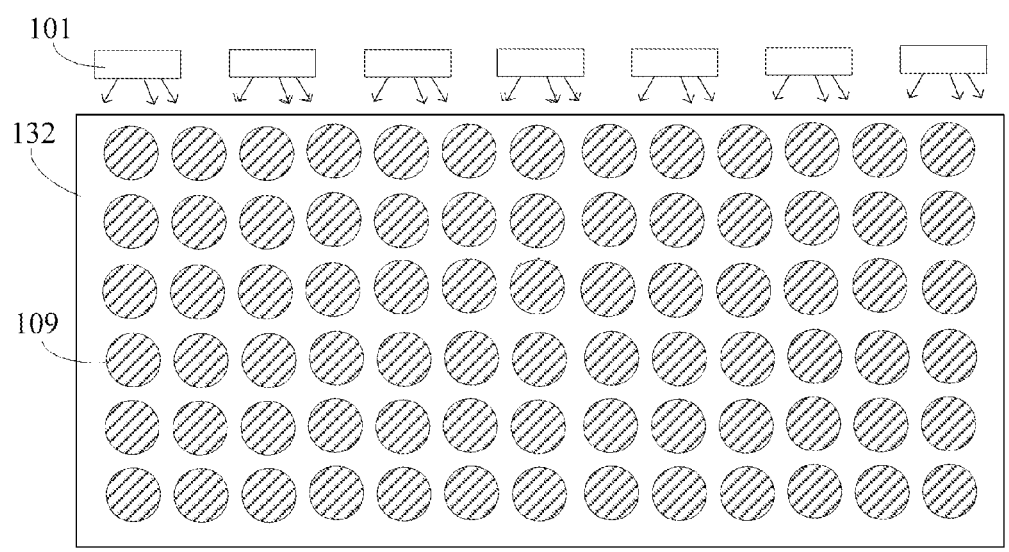
FIG. 8 is an illustration of a pattern composed by an ink printing patterns and a color compensation patterns.

FIG. 8 is an illustration of the pattern 109 composed by the ink printing patterns and the color compensation patterns. As shown in FIG. 8, the size of the pattern 109 remains unchanged, and is evenly distributed across the bottom surface 132 of the waveguide 102. There is no specially requirement to the size or dimension of the pattern 109, and it can be decided according to the field requirement. In the preferred embodiment, the diameter of dots which composes the pattern 109 varies from 0.2 to 0.4 mini-meter. Substantially, it can be selected to have a diameter of 0.2 mini-meter, and preferably, it can be 0.4 mini-meter. Since there is a great deal of dots which composes the pattern 109, and only a typical and simplified pattern 109 is illustrated.

In this embodiment, the color pigment of the pattern 109 is blue particle which is made from blue pigment. The percentage or density of the blue pigment within the pattern 109 increases as it becomes distant and distant from the light source 101. That is to say, the percentage of the blue pigment within the pattern 109 will vary proportionally to the distance with respect to the light source 101. Their variation is very much like to what disclosed in FIG. 2. Its working principle is also the same, and no further description is given accordingly.

In this embodiment, the color pigment within the pattern 109 can be yellow particle which is made from yellow fluorescent powder. In addition, the percentage of the yellow pigment within the pattern 109 will vary as the pattern 109 becomes distant and distant from the light source 101. See FIG. 9 for details.

Figure 9:
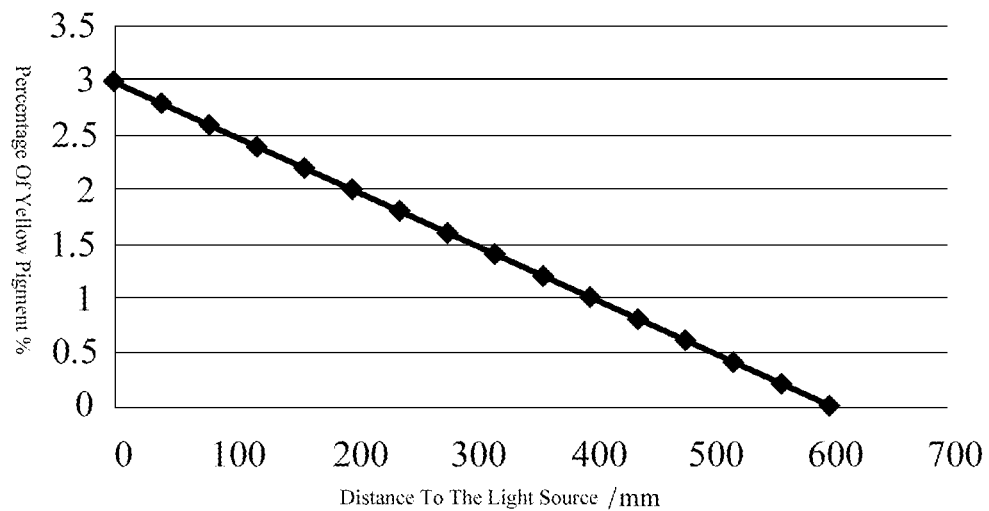
FIG. 9 is a diagram illustrating a variation of the percentage of a yellow pigment which varies proportionally to a distance with respect to a light source.

FIG. 9 is a diagram illustrating a variation of the percentage of a yellow pigment. disclosed in FIG. 7, which varies proportionally to a distance with respect to a light source 101. As shown in FIG. 9, the horizontal axis illustrates a distance of pattern 9 with respect to the light source 101, i.e. it shows a distance between the yellow pigment and the light source 101. Its unit is minimeter. The vertical axis represents the percentage of the yellow pigment within the pattern 109, and the percentage decreases as the distance with respect to the light source 101 become distant and distant.

From the analysis discussed above, it can be readily appreciated that the closer to the light source 101, the fewer the absorption of the light from the light source 101 by the waveguide 102. Accordingly, in this stage, the light is still bluish, and there is a need for yellow pigment to compensate the bluish light, i.e. this means the percentage of the yellow pigment has to be increased.

In this preferred embodiment, the largest percentage of the yellow fluorescent powder is 3%. However, with the light travels within the waveguide 102, the light with shorter wavelength absorbed by the waveguide 102 becomes more and more, and the light will become yellowish. Accordingly, no much compensation of the yellow fluorescent powder is needed, and the percentage or density of the yellow fluorescent powder is reduced gradually.

In this embodiment, when a distance of 600 mini-meter between the pattern 109 and the light source 101 is measured, there is no need of any yellowish color compensation within the waveguide 102.

Figure 10:
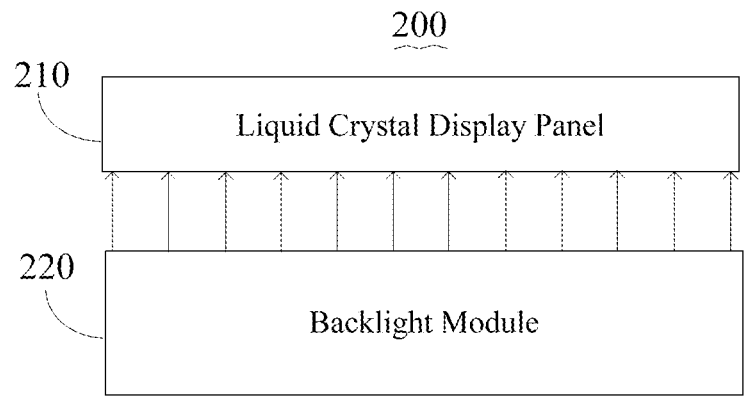
FIG. 10 is an illustration of a liquid crystal display device incorporated with the backlight module made in accordance with the present invention.

FIG. 10 is an illustration of a liquid crystal display device incorporated with the backlight module made in accordance with the present invention. As shown in FIG. 10. the liquid crystal display device 200 is incorporated with a liquid crystal display panel 210 and a backlight module 220. The panel 210 is disposed above the backlight module 220 so as to be lit up by the backlight module 220.

In this embodiment, the backlight module 220 can be embodied by any of above described backlight module 100 such that a uniform and homogeneous light beam is projected from the backlight module so as to reduce the chromatic aberration.

In conclusion, the reflector made in accordance with the present invention is coated with a pigment layer gradating from yellow to blue. In addition, the bottom surface of the waveguide is deployed with ink printing pattern and color compensation pattern, or deployed with pattern composed by ink and color particle. A color correction with the waveguide in a way that the projected light beam therefrom has a uniform color thereby reducing the chromatic aberration.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

The invention claimed is:

1. A backlight module, comprising:
a light source;
a waveguide including an light inlet surface facing the light source, and an light emitting surface being adjacent to the light inlet surface, and a bottom surface opposite to the light emitting surface;
a reflector disposed under the bottom surface of the waveguide;
an optical film disposed above the light emitting surface of the waveguide;
wherein the reflector is coated with a gradation color layer composed by yellow graduating to blue, wherein the percentage of the blue pigment proportionally increases as it is distant to the light source; and
wherein the bottom surface of the waveguide includes a printing pattern comprising a plurality of dots spaced from each other and each formed of a mixture of ink and pigments that comprise at least one of a blue pigment and a yellow pigment so that the percentage of the pigments within the dots of the printing pattern changes proportionally with respect to the distance with respect to the light source;
wherein the percentage of the blue pigment within the dots of the printing pattern increases proportionally when the distance to the light source increases; and alternatively, the percentage of the yellow pigment within the dots of the printing pattern decreases proportionally when the distance to the light source decreases.

2. A liquid crystal display device, comprising:
a liquid crystal display panel;
a backlight module, including:
a light source;
a waveguide including an light inlet surface facing the light source, and an light emitting surface being adjacent to the light inlet surface, and a bottom surface opposite to the light emitting surface;
a reflector disposed under the bottom surface of the waveguide;
an optical film disposed above the light emitting surface of the waveguide; and
wherein the reflector is coated with a gradation color layer composed by yellow graduating to blue;
wherein the gradation color layer includes a blue pigment, and the percentage of the blue pigment proportionally increases as it is distant to the light source;
wherein the bottom surface of the waveguide includes spaced dot-like patterns each formed of a mixture composed of ink and color pigments that comprise at least one of blue pigment and a yellow pigment, and a percentage of the pigments within the dot-like patterns changes proportionally with respect to the distance with respect to the light source; and
wherein the percentage of the blue pigment proportionally increases as it is distant to the light source; and alternatively, the percentage of the yellow pigment proportionally decreases as it is distant to the light source.

3. The liquid crystal display device as recited in claim 2, wherein the bottom surface of the waveguide includes ink printing patterns and color compensation patterns, wherein when the pigment is the blue fluorescent pigments, the he percentage of the blue pigment within the printing pattern increases proportionally when the distance to the light source increases; when the pigment is the yellow fluorescent pigments the percentage of the blue pigment within the printing pattern decreases proportionally when the distance to the light source decreases.

4. The liquid crystal display device as recited in claim 3, wherein dots of the printing pattern remain unchanged.

5. The backlight module as recited in claim 3, wherein the printing patterns and the color compensation patterns are single layer configuration, the printing patterns and the color compensation patterns are alternatively arranged across the bottom surface of the waveguide.

6. The backlight module as recited in claim 3, wherein the printing patterns and the color compensation patterns are stacked into two layers, and the color compensation patterns is arranged on a first layer of the bottom surface of the waveguide, and the ink printing patterns is located on a second layer of the bottom surface of the waveguide.

7. The backlight module as recited in claim 3, wherein the printing patterns and the color compensation patterns are stacked into two layers, the ink printing patterns is located on a first layer of the bottom surface of the waveguide, and the color compensation patterns is arranged on a second layer of the bottom surface of the waveguide.

* * * * *